March 3, 1964　　　　　L. SEARLE　　　　　3,123,396
HAMMOCK SEAT

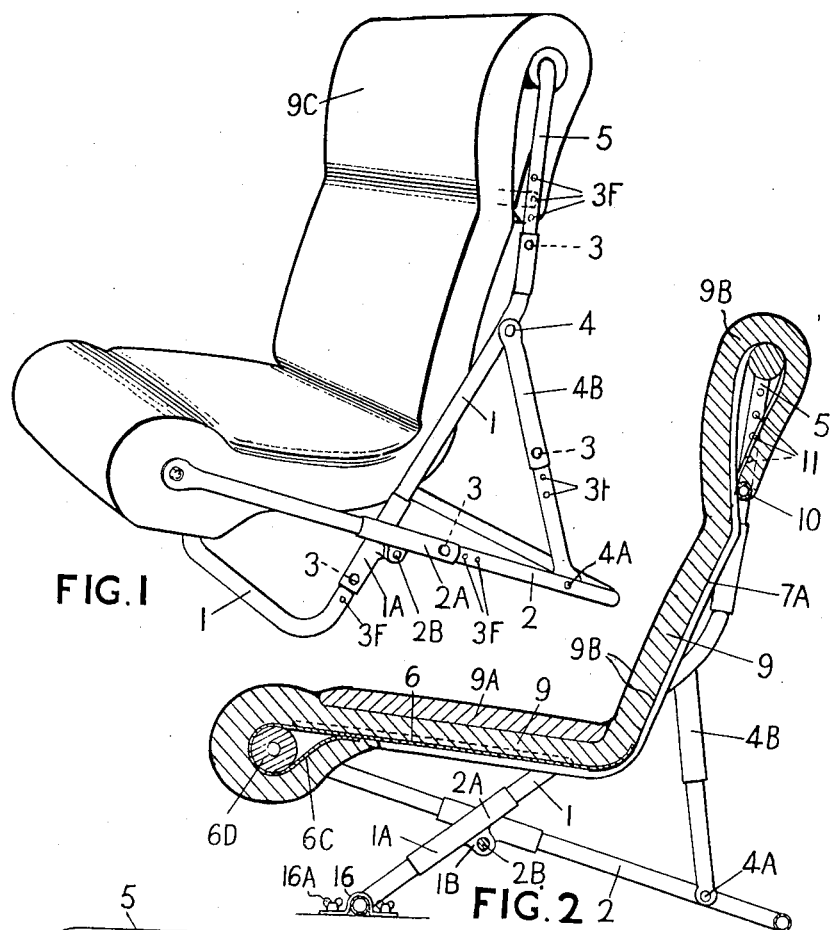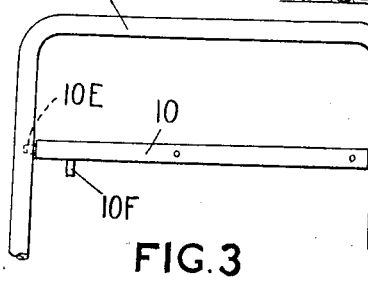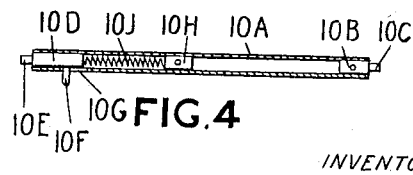

Filed Feb. 27, 1961　　　　　　　　　　　　　　　4 Sheets-Sheet 2

INVENTOR
LINDLEY SEARLE
BY Lockwood, Woodard, Smith & Weikart
ATTORNEY

March 3, 1964  L. SEARLE  3,123,396
HAMMOCK SEAT
Filed Feb. 27, 1961  4 Sheets-Sheet 3
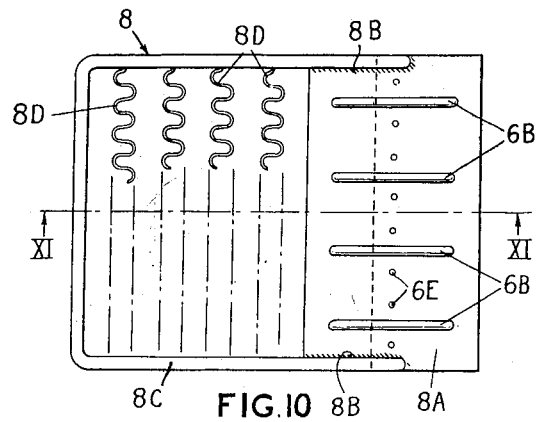
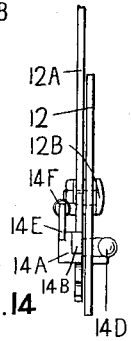
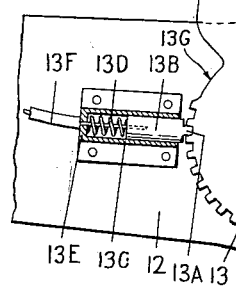
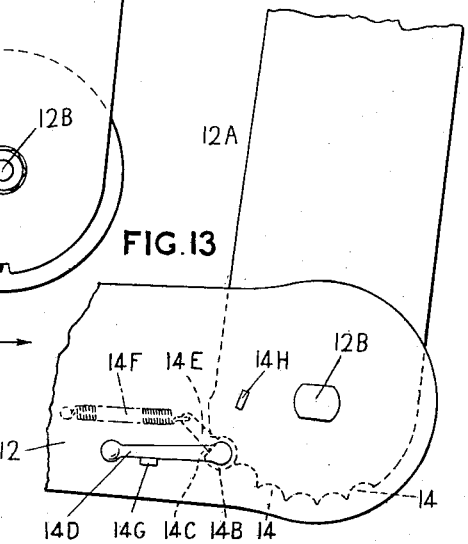
INVENTOR
LINDLEY SEARLE
BY *Lockwood, Woodard, Smith & Weikart*
ATTORNEYS March 3, 1964  L. SEARLE  3,123,396
HAMMOCK SEAT
Filed Feb. 27, 1961  4 Sheets-Sheet 4
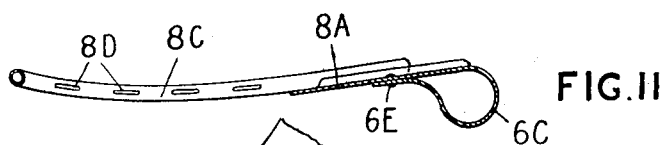
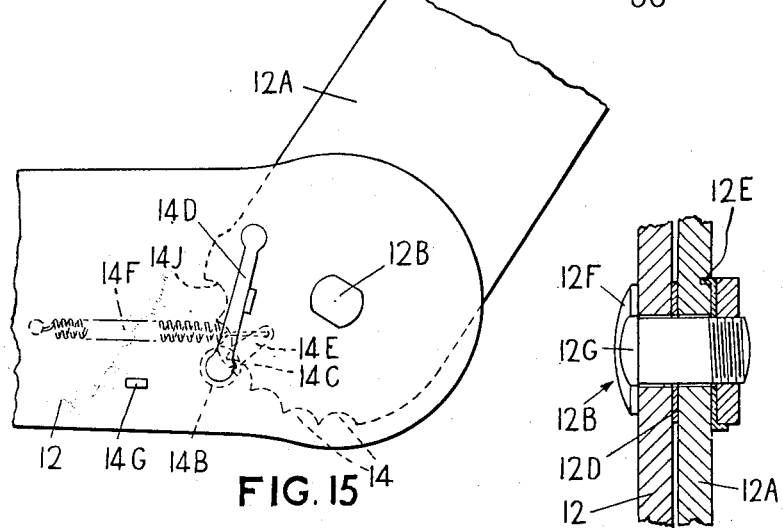
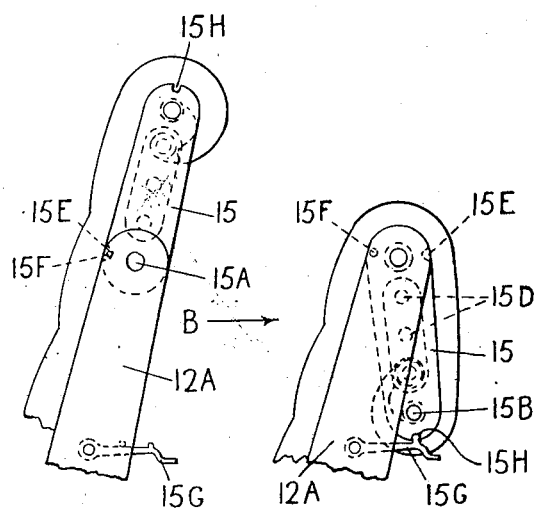
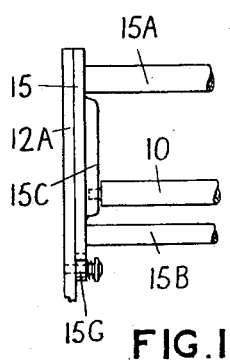
INVENTOR
LINDLEY SEARLE
BY Lockwood, Woodard, Smith & Weikart
ATTORNEY

ABSTRACT

UNITED STATES PATENT OFFICE 3,123,396
Patented Mar. 3, 1964

3,123,396
HAMMOCK SEAT
Lindley Searle, Green Gates, Cross Oak Road,
Berkhamsted, England
Filed Feb. 27, 1961, Ser. No. 92,000
6 Claims. (Cl. 297—114)

This invention relates to a seat or hammock.

An object of this invention is to provide a seat or hammock, more especially for use in a car, which seat automatically conforms to the shape of the body, may be readily adjusted to give the maximum of comfort for the user, is light in weight, and easily transportable.

According to this invention a seat or hammock comprises a seat frame and a back frame which are pivotally secured together so that they may be adjusted angularly with respect to each other, means for retaining the frames in adjusted angular relationship, a squab for the seat or hammock slung between a top member of the back frame and a front member of the seat frame so that the squab automatically conforms to the shape of the body of an occupant of the seat or hammock and means for upward and downward adjustment of the squab.

The invention also includes a seat or hammock, as previously described, which includes an extensible head rest.

In order that the invention may be clearly understood it will now be described more fully, by way of example, with reference to the accompanying drawings, in which:

FIGURE 1 is a perspective view of a seat or hammock in accordance with the invention;

FIGURE 2 is a central vertical section through the seat or hammock shown in FIGURE 1;

FIGURE 3 is a detail of the upper end of the back frame showing the adjuster bar for the rising and falling headrest;

FIGURE 4 is a longitudinal section of the adjuster bar;

FIGURE 10 is a plan of a modified seat panel in accordance with the invention;

FIGURE 11 is a section on line XI—XI of FIGURE 10;

FIGURE 12 is a detail of the locking mechanism for the fine adjustment of the rising and falling squab;

FIGURE 13 is a detail of alternative locking mechanism for coarse adjustment of inclination of the rising and falling squab;

FIGURE 14 is an elevation in the direction of the arrow A, FIGURE 13;

FIGURE 15 is a detail corresponding to FIGURE 13 showing the locking mechanism released;

FIGURE 16 is a section to an enlarged scale through the pivotal connection of the frames of the seat or hammock shown in FIGURE 9;

FIGURE 17 is a detail of the rising and falling headrest for use with the seat or hammock shown in FIGURE 9, the headrest being in the extended position;

FIGURE 18 is a detail corresponding to FIGURE 17, but showing the headrest in its folded down position, and FIGURE 19 is an elevation in the direction of the arrow B, the squab having been omitted.

Figure 5:
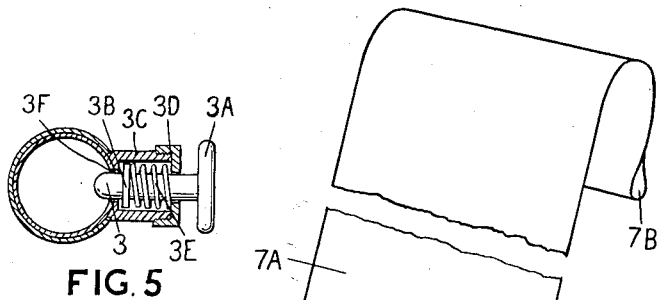
FIGURE 5 is an axial section of the spring loaded peg for locking together the telescopic tubes.

Referring to FIGURES 1 to 5, inclusive, two U-shaped frames 1 and 2, formed from a light weight metal tube, have slidable sleeves 1A and 2A, respectively, on each side of the seat. The sleeve 1A has a lug 1B and the sleeve 2A has a similar lug 2B, the lugs being pivotally connected to a cross bar 2C. Thus, the frames 1 and 2 may be angularly adjusted. Carried by each sleeve is a locking peg 3 shown more particularly in FIGURE 5. The peg has a head 3A and an annular flange 3B which is slidable in a tubular housing 3C having an apertured cap 3D. Between the flange and the cap is a compression spring 3E which loads the peg inwardly of the sleeve and the adjacent tube, the peg projecting through coincident holes in the sleeve and tube. In the frames 1 and 2 are a series of holes 3F for engagement by the pegs, thus by freeing the pegs by pulling their heads against the action of their respective springs, the sleeves can be slid along their tubes and locked in selected holes of the series 3F by releasing the heads. It will be seen that the arrangement provides for the forward and upward adjustment of the seat or hammock.

Pivotally connected to the frames 1 and 2, as at 4 and 4A on each side of the seat or hammock, is a telescopic tubular strut 4B having locking means identical to that previously described. By similarly adjusting the length of both struts, the inclination of the back of the seat may be altered as desired.

It will be apparent that by disengaging the spring loaded pegs 3 and allowing the frame 1 to slide down to its lowest position, a reclining position is provided for the occupant of the seat, which position may be particularly useful if the seat is fitted to a car and the driver or passenger wishes to sleep.

Telescoping into the upper end of the frame 1 is an inverted U-shaped tubular extension 5 (FIGURE 3), which may be locked in adjusted position by spring loaded pegs similar to those previously described. The extension 5 enables the extent of the upward projection of the back of the seat to be adjusted.

Figure 6:
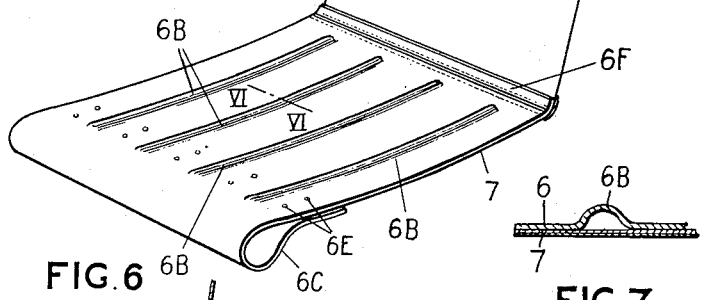
FIGURE 6 is a perspective view of the seat panel and terylene base.
Figure 7:
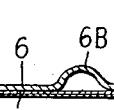
FIGURE 7 is a section to an enlarged scale on line VI—VI of FIGURE 6.
Figure 8:
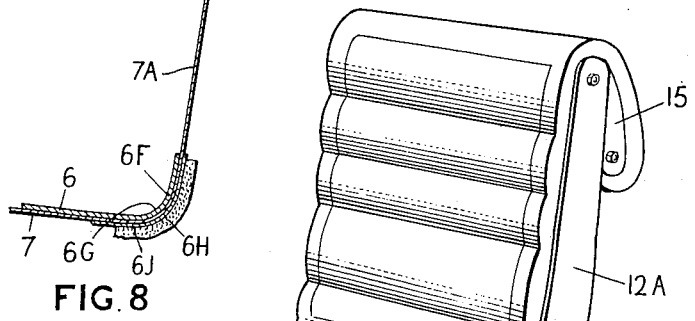
FIGURE 8 is a detailed vertical section, to an enlarged scale, through the junction of the seat panel and the terylene base.

A seat base 6 comprises a sheet metal panel 6A, preferably sheet aluminium. The panel may be flat as indicated in FIGURE 2, but it is preferred that it should be slightly concave as shown in FIGURE 6 so as to give greater comfort to the user of the seat. In order to prevent distortion when in use the panel is formed with swaged ribs 6B. The panel is looped as at 6C around a front transverse member 6D of the seat, the loop being secured by rivets 6E. The panel has an upturned edge 6F which provides a radius 6G which prevents the seat upholstery from being cut when the seat is being used in the normal driving position. In order to prevent discomfort to the shins of a passenger immediately behind the seat, a strip 6H of foam rubber may be fixed at the position indicated in FIGURE 8. The panel fits closely in the seat frames and the ends of the loop 6C serve to prevent side rock of the seat frames.

The panel has a neoprene coated terylene base 7 bonded to the panel. The base extends upwardly as at 7A and is looped at 7B for attachment to a transverse adjusting bar to be hereinafter described. Prior to the attachment of the foam rubber strip 6H, two reinforcing strips 6J of neoprene coated terylene may be bonded to the base where it curves over the upturned edge 6F.

Referring to FIGURES 10 and 11, a modified seat base 8 comprises a metal panel 8A. Welded to the panel as at 8B is a U-shaped frame 8C of light weight steel tubing. Connected to the frame 8C are flat springs 8D which give flexibility to the seat base where the weight of the body of the sitter is applied.

The upholstery for the seat consists of a polyether or foam rubber mattress 9 (FIGURE 2), approximately 2 inches thick, the mattress covering the entire seat base 6, 7A. An additional mattress 9A gives extra comfort to the occupant of the seat. The base and mattresses are encased in an envelope 9B of any desired fabric. The mattress 9 passes over the front transverse member 6D of the frame 2 and is bonded, or otherwise secured, to the underside of the seat panel. The upholstery provides a headrest 9C and at the head of the seat the upholstery passes over a headrest tube 9D and is secured to an adjuster member 10 (FIGURES 3 and 4).

The adjuster member comprises a tube 10A in which is fixed a plug 10B having a spigot 10C. Slidable in the other end of the tube is a cylindrical member 10D having a spigot 10E similar to the spigot 10C. The member 10D has a lever 10F slidable in a slot 10G in the tube. A fixed stop 10H provides an abutment for a compression spring 10J, the arrangement being such that the member 10D can be moved inwardly of the tube by operating the lever 10F against the action of the spring.

In the upper part of the seat frames are aligned and opposite sides of holes 11 which receive the spigots 10C and 10E. By depressing the lever 10F, the adjuster bar 10 can be released from one position and reinserted in another position by selecting any two of the opposite disposed holes 11. Since the headrest upholstery is attached to the adjuster bar, the arrangement provides for the tensioning of the upholstery.

Figure 9:
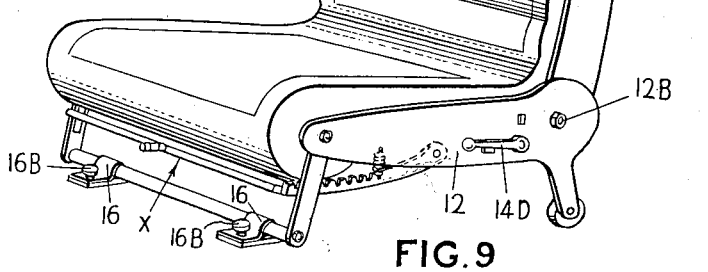
FIGURE 9 is a perspective view of a preferred seat or hammock in accordance with the invention.

In the preferred construction of seat shown in FIGURE 9, two pressed steel frames 12 and 12A are pivotally connected together on each side by a bolt 12B having a nut 12C. Between the frames is a washer 12D and under the nut is a lock washer 12E. The bolt has a head 12F formed with flats 12G for gripping. Below the front of the seat is a known device, indicated generally at X, comprising spring loaded ratchets for the control of the forward and backward movements.

Since the seat shown in FIGURE 9 constitutes a hammock seat, the weight of a person sitting on the seat induces the mattress or squab to close up, but in the arrangement to be described no return spring is necessary. It is thus possible to use a simple locking device whereby the angular relationship of the frames 12 and 12A may be adjusted thereby providing for a rising and falling squab. Referring to FIGURE 12, the lower end of one side of the frame 12A is substantially semi-circular, the curve being described from the centre of the pivot bolt 12B. In the periphery of the curve are detents 13 which may be selectively engaged by a tooth 13A formed on a plunger 13B slidable within a cylindrical or square housing 13C mounted on the frame 12. The tooth is urged into engagement with a detent by a compression spring 13D having an abutment against an end wall 13E in the housing. Anchored to the plunger is the inner member of a Bowden wire cable 13F. By operating the Bowden cable it is thus possible to disengage the tooth from a detent and to adjust the angular relationship of the frames as desired. The curved end has a sector 13G devoid of detents. This enables the squab to be pushed forwardly clear of a rear passenger and permits easy entrance into a car. The arrangement described provides for the fine adjustment of the angular relationship of the frames.

For the coarse adjustment of the angular relationship of the frames, the lower end of each side of the frame 12 is formed with sprocket teeth 14 (FIGURES 13, 14 and 15). Welded to, or formed on, a rockable member 14A is a tooth 14B having a profile corresponding to that of the valleys between the sprocket teeth. The tooth is radiused as at 14C, the radius being described from the centre of the pivotal bolt 12B, and slightly exceeding the radial distance of the teeth from the centre of the bolt. The tooth may have a flat instead of a radius. Fixed to one end of the bar 14A is a lever 14D and when this is in the position shown in FIGURE 13 the tooth 14B engages in a valley between the sprocket teeth and locks the frames together. Carried by the bar 14A is an arm 14E to which is anchored a tension spring 14F which loads the lever 14D downwardly against a stop 14G fixed to the frame 12.

If the lever 14D is raised against the action of the spring 14F until it engages a stop 14H on the frame 12, the radiused part 14C of the tooth 14B will be located opposite the sprocket teeth and will clear them as shown in FIGURE 15. It is now possible to swing the frame 12A in any desired angular position with respect to the frame 12, and to lock the frames in an adjusted position by merely releasing the lever 14D as will be understood. If desired, a projection 14J may be provided on the rounded end of each frame 12A at the position indicated which projection is engageable by the tooth 14B so that the frame 12A and its squab do not over-run the upright position of the seat.

A rising and falling headrest for use with the seat, shown in FIGURE 9, comprises an extension member 15 for each side of the frame 12A. Each extension is pivoted to the frame 12A by a threaded projection on a headframe top tube 15A. The seat upholstery passes over a headrest transverse tube 15B fixed between the member 15 and is secured to an adjuster bar 10 which is identical to that shown in FIGURE 4. Welded to the inside faces of the members 15 are thickeners 15C each having a series of holes 15D to receive the spigots of the adjuster bar. In each of the members 15 is a notch 15E which engages a stop 15F fixed to the frame 12A when the members 15 are fully extended as shown in FIGURE 17 thereby aligning the extensions with the side members of the frame 12A. The headrest is maintained in the upright position by the weight of a person occupying the seat. When the headrest is in the down position, as shown in FIGURE 18, it may be locked by a spring loaded catch 15G which engages a slot 15H in one of the extensions 15.

It is to be understood that the seat base construction shown in FIGURES 6, 7, 8, 10 and 11 is also applicable to the seat illustrated in FIGURE 9.

The two seats described are each fixed to a floor by a pair of clips 16 secured by bolts and wing nuts 16A (FIGURE 2) or headed screws 16B (FIGURE 9). Thus, it is possible to easily remove the seats for use in another location.

I claim:

1. A hammock seat comprising in combination a seat frame and a back frame pivoted together, said back frame including a top transverse member at the distal end thereof and said seat frame including a front transverse member at the distal end thereof, means whereby the frames may be retained in adjusted angular relationship, a squab slung between the top transverse member of the back frame and the front transverse member of the seat frame, a seat base for the squab comprising a rigid metal panel attached to the said front transverse member, a textile squab base bonded to said panel, an upwardly and downwardly adjustable member carried by the back frame to which member the upper end of said squab base and also that of the squab are secured, a further transverse member adjustably mounted upon said back frame and adjustable toward and away from said top transverse member, said squab extending over said top transverse member and connected to said further transverse member whereby the attitude of said panel can be adjusted, said squab and squab base hanging free except where connected to said further transverse member and slung between said front transverse member and said top transverse member.

2. A hammock seat as claimed in claim 1 in which the seat base for the squab comprises a concave and ribbed metal panel to which is bonded a textile squab base coated with a resilient material.

3. A hammock seat as claimed in claim 1 in which the seat base for the squab comprises a concave and ribbed metal panel having a U-shaped extension which mounts a plurality of horizontal springs.

4. A hammock seat comprising a supporting frame including a top member and a front member, a flexible upholstery unit slung and hanging free between said top member and front member, a rigid panel connected to said front member and to said unit and defining a seat portion in said unit, said unit also including a back portion which joins said seat portion and is connected to said top member, said panel causing said seat portion to be relatively rigid as compared to said back portion.

5. The hammock seat of claim 4 in which said rigid panel is connected to the underside of said unit and in which said unit is formed of soft resilient material whereby the seat portion is soft but the general shape thereof is maintained by said panel.

6. A hammock seat comprising a supporting frame including a top member and a front member, an upholstery unit slung and hanging free between said top member and front member, said unit including a seat portion which is connected to said front member, said unit further including a back portion which joins said seat portion and is connected to said top member, said seat portion being relatively rigid and said back portion being relatively flexible as compared to each other.

References Cited in the file of this patent

UNITED STATES PATENTS

| | | |
|---|---|---|
| 1,506,464 | Alten | Aug. 26, 1924 |
| 2,540,823 | Heller | Feb. 6, 1951 |
| 2,892,489 | Hurley | June 30, 1959 |
| 2,893,476 | Liljengren | July 7, 1959 |

FOREIGN PATENTS

| | | |
|---|---|---|
| 316,674 | Switzerland | Dec. 15, 1956 |
| 686,734 | France | Apr. 15, 1930 |
| 721,137 | Great Britain | Dec. 29, 1954 |
| 788,065 | France | July 22, 1935 |
| 1,100,938 | France | Apr. 13, 1955 |